(12) United States Patent
Jordan et al.

(10) Patent No.: US 11,279,600 B1
(45) Date of Patent: Mar. 22, 2022

(54) SWITCHING ASSEMBLY FOR ROPE-PULLING EQUIPMENT

(71) Applicants: David S. Jordan, Knoxville, TN (US); Michael C. Jordan, Knoxville, TN (US)

(72) Inventors: David S. Jordan, Knoxville, TN (US); Michael C. Jordan, Knoxville, TN (US)

(73) Assignee: iTool Equipment Holding LLC, Clinton, TN (US)

( * ) Notice: Subject to any disclaimer, the term of this patent is extended or adjusted under 35 U.S.C. 154(b) by 273 days.

(21) Appl. No.: 16/501,952

(22) Filed: Jul. 9, 2019

(51) Int. Cl.
*B66D 1/50* (2006.01)

(52) U.S. Cl.
CPC .................... *B66D 1/505* (2013.01)

(58) Field of Classification Search
CPC .......... B66D 1/505; H02G 1/06; H02G 1/085; B66F 1/06
See application file for complete search history.

(56) References Cited

U.S. PATENT DOCUMENTS

| | | | | |
|---|---|---|---|---|
| 3,224,733 A * | 12/1965 | Ensley | .................... | H02G 1/085 254/134.3 R |
| 4,456,225 A * | 6/1984 | Lucas | .................... | H02G 9/10 254/134.3 FT |
| 5,464,193 A * | 11/1995 | Wrate | .................... | B65H 51/32 254/134.3 FT |
| 6,286,815 B1 * | 9/2001 | Ray | .................... | B65H 51/06 254/134.3 R |
| 6,431,524 B1 * | 8/2002 | Weber | .................... | H02G 1/08 254/134.3 FT |
| 6,682,050 B1 * | 1/2004 | Ray | .................... | B65H 51/06 254/134.3 R |
| 8,308,138 B1 * | 11/2012 | Jordan | .................... | H02G 1/08 254/134.3 FT |
| 9,172,224 B2 * | 10/2015 | Jordan | .................... | H02G 1/06 |
| 10,892,607 B2 * | 1/2021 | Schmidt | .................... | H02G 1/085 |
| 2009/0064854 A1 * | 3/2009 | Mamet | .................... | F41A 19/25 89/135 |
| 2010/0327242 A1 * | 12/2010 | Radle | .................... | H02G 1/083 254/134.3 R |

* cited by examiner

*Primary Examiner* — Emmanuel M Marcelo
(74) *Attorney, Agent, or Firm* — Michael E. McKee

(57) ABSTRACT

A switching assembly for rope-pulling equipment including mechanisms for holding an electrically-operated power tool for rotating a capstan about an axis and which power tool includes a depressible ON/OFF switch utilizes an actuator having a switch-engaging portion which is mounted for pivotal movement between a first condition at which the switch of the power tool is in an OFF position and a second condition at which the switch of the power tool is depressed by the switch-engaging portion to switch the power tool ON. The actuator further includes a rope-engaging section so that by wrapping a section of rope to be pulled about the capstan, routing an end of the rope about the rope-engaging section and then appropriately pulling upon the end of the rope, the actuator is pivoted from the first to the second condition, and the rope is advanced along the equipment by the rotating capstan.

20 Claims, 6 Drawing Sheets

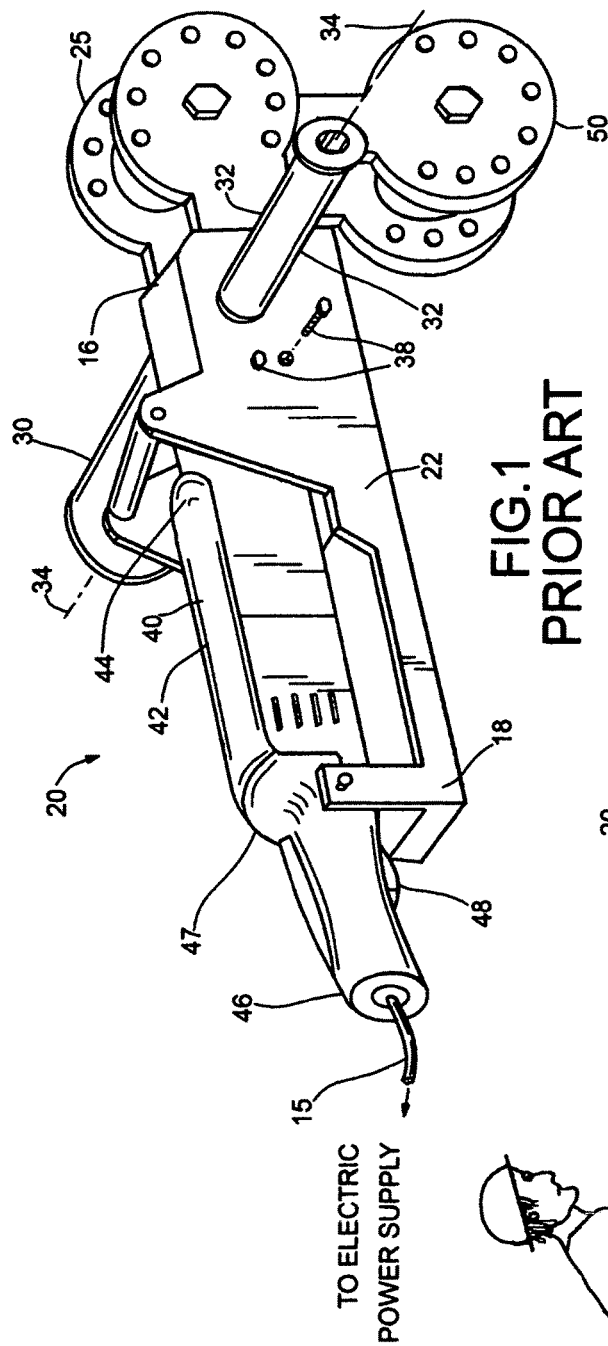
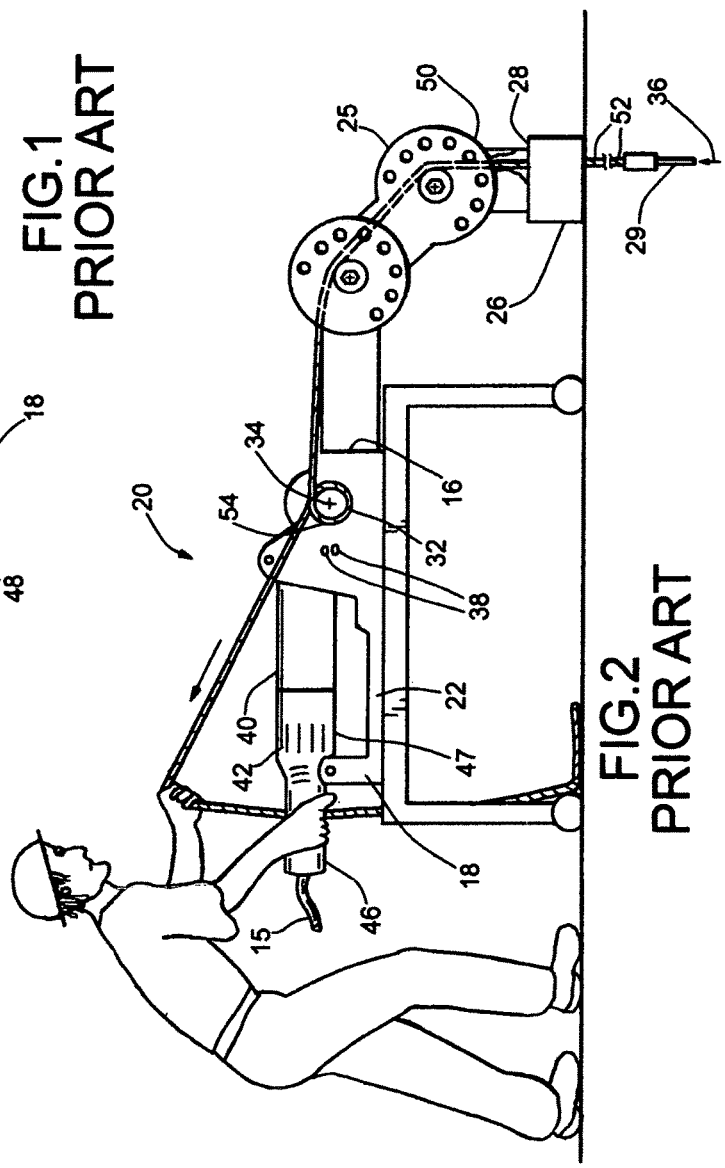
FIG. 1 PRIOR ART
FIG. 2 PRIOR ART

SWITCHING ASSEMBLY FOR ROPE-PULLING EQUIPMENT

BACKGROUND OF THE INVENTION

This invention relates generally to equipment used for pulling rope (or a wire secured to the rope) through a conduit and relates, more particularly, to means and methods by which such a rope-pulling apparatus is operated.

The class of equipment within which this invention is concerned includes rope-pulling equipment which utilizes a rotating capstan about which a section of rope to be pulled is wound. As the section of pulling rope is manually tensioned about the rotating capstan, the pulling rope is advanced along the equipment.

An example of a wire or rope puller of the aforedescribed class is shown and described in U.S. Pat. No. 9,172,224 which names the same inventors as the instant application.

For powering such equipment, a power tool can be connected in driving relationship with the capstan by way of, for example, a gearbox disposed intermediate of the power tool and the capstan. Such power tools commonly possess a grip within which a trigger-style ON/OFF switch is mounted so that operation of such a power tool commonly requires that an operator must maintain a grip with one hand about the grip of the power tool in order to control the ON/OFF operation of the tool. It can be difficult for a single operator to control the ON/OFF operation of such a power tool while also controlling the tension of the rope about the rotating capstan.

It would be desirable to provide a means by which the tension the section of rope wound about the rotating capstan of such equipment can be controlled by a single operator without requiring that an operator maintain one of his hands grasped about the grip of a power tool for operating the ON/OFF switch of the power tool.

Accordingly, it is an object of the present invention to provide a new and improved means enabling a single operator to control the tension of the rope wound about a rotating capstan of a wire or rope-pulling equipment while also controlling the ON/OFF operation of the power tool used to power the equipment.

Another object of the present invention is to provide such an assembly which does not require that an operator maintain a hand grasped about the grip of the power tool during a rope-pulling operation.

Still another object of the present invention is to provide such an assembly which includes an actuator which is pivotally movable into and out of engagement with the trigger-style ON/OFF switch of the power tool.

Yet another object of the present invention is to provide such an assembly wherein the actuator is spring-biased to a condition at which the power tool is switched OFF so that in the event that the pulling rope is released by the operator, the power tool is automatically switched OFF.

A further object of the present invention is to provide such an assembly which is uncomplicated in structure, yet effective in operation.

SUMMARY OF THE INVENTION

This invention resides in a switching assembly for rope-pulling equipment having a forward end and a rearward end and a base upon which a capstan is mounted for rotation about an axis and which is adapted to support an electrically-powered power tool for rotating the capstan about its rotation axis. Furthermore, the power tool includes an ON/OFF switch which is movable between an extended condition at which the power tool is switched OFF and a depressed condition at which the power tool is switched ON and wherein the ON/OFF switch of the power tool is biased from the depressed condition toward the extended condition, and wherein rope is pulled with the equipment by wrapping a section of the rope about the capstan, switching the power tool ON and pulling upon the rope to tension the section of the rope wound about the capstan to thereby advance the rope along the equipment from the forward end toward the rearward end thereof as the capstan is rotated.

The switching assembly includes an actuator having a switch-engaging portion and which is mounted upon the equipment for pivotal movement relative to the base about an axis of pivot between a rearward condition at which the switch-engaging portion of the actuator is out of engagement with the ON/OFF switch of the power tool and a forward condition at which the switch-engaging portion of the actuator is in engagement with the ON/OFF switch of the power tool and maintains the ON/OFF switch in the depressed condition. The actuator has a rope-engaging section which is disposed in such a relationship with the capstan so that by wrapping a section of rope to be pulled about the capstan and then routing an end of the rope around the rope-engaging section of the actuator, the end of the rope can thereafter be pulled forwardly of the equipment to pivot the actuator about the axis of pivot to the forward condition at which the ON/OFF switch of the power tool is moved to the depressed condition and to tension the section of rope which is wound about the capstan so that rotation of the capstan advances the rope along the equipment as aforesaid.

BRIEF DESCRIPTION OF THE DRAWINGS

FIG. 1 is a perspective view of rope-pulling equipment of the prior art.

FIG. 2 is a side elevation view of the prior art rope-pulling equipment of FIG. 1 shown being used by an operator for advancing a pulling rope through a conduit.

DETAILED DESCRIPTION OF AN ILLUSTRATIVE EMBODIMENT

Figure 3:
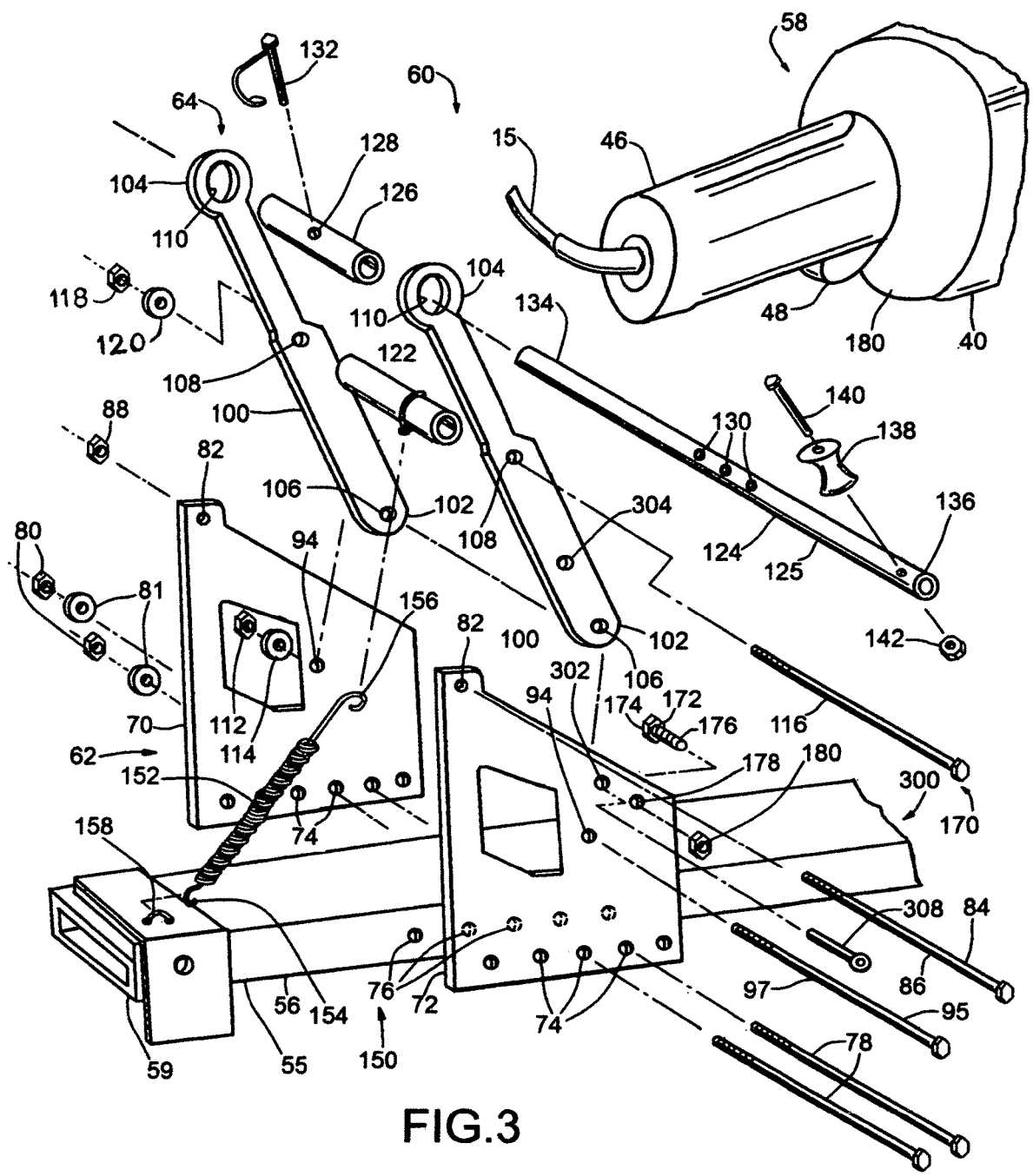
FIG. 3 is a perspective view of an embodiment, shown exploded, of a switching assembly within which features of the present invention are embodied and rope-pulling equipment with which the switching assembly can be utilized.

Turning now to the drawings in greater detail and considering first FIG. 1, there is illustrated wire or rope-pulling equipment, generally indicated 20, with which the present invention is concerned, and there is depicted in FIG. 2 an exemplary environment within which the FIG. 1 equipment is intended to be used. Briefly, the rope-pulling equipment 20 of FIGS. 1 and 2 includes an elongated base or frame 22 having a forward end 16 and an opposite rearward end 18 and includes an arm arrangement 25 which extends forwardly of the forward end 16 of the frame 22. When the equipment 20 is positioned for use, as shown in FIG. 2, the free end, indicated 50, or the arm arrangement 25 is positioned adjacent a conduit 26 (having an opening 28) through which a tension member 29, such as a wire, rope or cable, is desired to be pulled. A pair of capstans 30, 32 (having diameters of different sizes) are rotatably mounted upon the capstan-supporting portion 24 of the frame 22 for rotation about a common rotation axis 34, and a gearbox (not shown) is drivingly connected to the capstans 30, 32 so that by rotating the drive shaft of the gearbox 36, the capstans 30, 32 are rotated about the axis 34.

For purposes of rotating the capstans 30, 32 about the rotation axis 34, there is provided an electrically-powered portable power tool 40 having an elongated housing 42 within which an electric motor (not shown) is housed and a power cord 15 through which electric current is conducted to the electric motor; and there is associated with the forward end (i.e. the working end) 44 of the housing 42 a rotating instrument, such as a tool-holding chuck, which is connectable to the drive shaft of the gearbox for rotating the capstans 30, 32 about the axis 34 when the tool 40 is energized (i.e. switched ON). The equipment 20 also includes securement means, including bolts 38 which are threaded through openings provided within the frame 22 and tightened against a side of the housing 42 of the power tool 40, for securing the housing 42 in a fixed relationship with respect to the frame 22. The depicted tool 40 also includes a hand grip portion 46 disposed adjacent the rearward end, indicated 47, of the housing 42 opposite the forward, or working, end 44 thereof; and a trigger-style ON/OFF switch 48 is incorporated within the hand grip portion 46.

The ON/OFF switch 48 of the power tool 40 is movable between a depressed (i.e. a raised, or power ON) condition and an extended (i.e. a lowered, or power OFF) condition so that when the hand grip portion 46 is grasped by a hand of the user, the switch 48 can be manipulated (i.e. depressed or released) with the index finger of the grasping hand to switch the motor of the tool 40 ON or OFF. Commonly, the switch 48 is spring-biased from its depressed, or raised, condition toward an extended, or lowered, condition so that while the depression (or squeezing) of the trigger-style switch 48 to its depressed condition turns the tool 40 ON, the subsequent release of the switch 48 permits the ON/OFF switch 48 to return to its extended condition (under the influence or, more particularly, the downwardly-directed spring-induced forces exerted upon the ON/OFF switch 48) so that the power tool 40 is turned OFF.

An example of wire-pulling equipment comparable to that of the aforedescribed equipment 20 is commercially available from iTool of Oak Ridge, Tenn. under the trade designation CANNON 6K. Meanwhile, an example of a portable power tool comparable to that of the aforedescribed hand tool 40 is commercially available from Milwaukee Electric Tool Corp. of Brookfield, Wis. under the trade designation SUPER HAWG.

Furthermore and although the power tool 40 is depicted and described herein as being electrically powered with current delivered to the motor thereof by way of a power cord 15, a power tool 40 with which this invention can be used could be battery-operated. Accordingly, the principles of this invention can be variously applied.

When utilizing the depicted FIG. 1 pulling equipment 20 and hand tool 40 for pulling a wire or other tension member 29 through the opening 28 of the conduit 26 and as best shown in FIG. 2, the free end 50 of the arm arrangement 25 of the equipment 20 is appropriately braced adjacent an end of the conduit 26, and a pulling rope 52 is routed through the conduit 26 and secured at one end (i.e. a trailing end) to the wire or other tension member 29 desired to be pulled through the conduit 26 by way of the equipment 20. The other end of the pulling rope 52 (i.e. the leading end of the rope 52 disposed opposite the wire or tension member 29 tied thereto) is routed along the arm arrangement 25 (and across any pulleys supported therealong) and wrapped or wound (e.g. with a single wrap) about a selected one of the capstans 30, 32, and then the hand tool 40 is switched ON to rotate the capstan 30 or 32 about the axis 34. As is known in the art, the amount of pulling torque desired to be exerted upon the pulling rope 52 commonly dictates which of the two capstans 30 or 32 is wrapped with the rope 52 for pulling purposes. For example, the wrapping of the rope 52 about the capstan 30 of larger diameter will exert a smaller amount of rope-pulling torque upon the rope 52 than is exerted upon the rope by the capstan 32 of smaller diameter. Within the depicted equipment of FIG. 2, the rope 52 is wrapped about the capstan 32 of smaller diameter.

As the capstan 32 is rotated about its rotation axis 34, the manual pulling of the rope 52, as depicted in FIG. 2, by an operator so that the section, indicated 54, of the rope 52 wrapped about the capstan 32, is pulled taut about the capstan 32 so that the rope 52 is frictionally gripped by the surface of the capstan 32. The resulting frictional grip engagement between the surface of the capstan 32 and the rope 52 binds the rope 52 to the surface of the capstan 32 and effects the advancement, or equipment-induced pulling, of the rope 52 along and through the conduit 26 in the direction of the FIG. 2 arrow 36. When the operator sufficiently relaxes his pull upon the rope section 54, the capstan 32 looses its frictional grip upon the wrapped section 54 of the rope 52 so that the advancement of the rope 52 through the conduit 26 ceases. It therefore follows that by appropriately tensioning the rope 52 so that the capstan 32 either pulls upon the rope 52 (by way of the frictional gripping engagement between the surface of the capstan 32 and the rope 52), the rate of advancement of the rope 52 through and out of the conduit 26 can be controlled by an operator as he pulls upon the rope 52 in somewhat of a hand-over-hand maneuver.

It will also be understood that during a rope-pulling operation performed by the equipment 20 of FIG. 1 and as depicted in FIG. 2, the capstans 30, 32 will only be rotated about the axis 34 by way of the power tool 40 if the power tool 40 is switched ON. This being the case, it can be a difficult task for a single operator whose job it is to both control the tension exerted upon the rope 52 (for controlling the advancement of the rope 52 through and out of the conduit 26) and also maintain a grip, or trigger-depressing squeeze, upon the trigger-style ON/OFF switch 48 of the power tool 40 in order that the tool 40 is continually energized during a rope-pulling operation.

As will be apparent herein, the switching assembly of the present invention enables an operator to both switch the tool 40 ON and pull upon the rope 52 (to control the tightness of the rope portion 54 about the capstan 30 or 32) in a single operation, or action.

With reference to FIGS. 3-9, there is depicted wire or rope-pulling equipment 58 within which an embodiment of a switching assembly, generally indicated 60, is employed. More specifically, the switching assembly 60 embodies features of the present invention and enables an operator to perform in a single operation the switching of the power tool 40 ON and the maintaining of control (through his pull upon the pulling rope 52) of the tautness of the rope section 54 about the capstan 32. As is the case with the equipment 20 of FIGS. 1 and 2, the equipment 58 of FIGS. 3-9 includes an elongated base, or frame, 56 having a forward end 57 and an opposite rearward end 59 and includes a securement means, including bolts 38 (FIG. 9), for securing the power tool 40 in a fixed relationship with respect to the base 56. The frame 56 includes a base rail 55 which extends between the forward and rearward ends 57, 59; and as will be apparent herein, it is above this rail 55 that the hand grip portion 46 of the tool 40 is held in a spaced relationship by the switching assembly 60.

Figure 4:
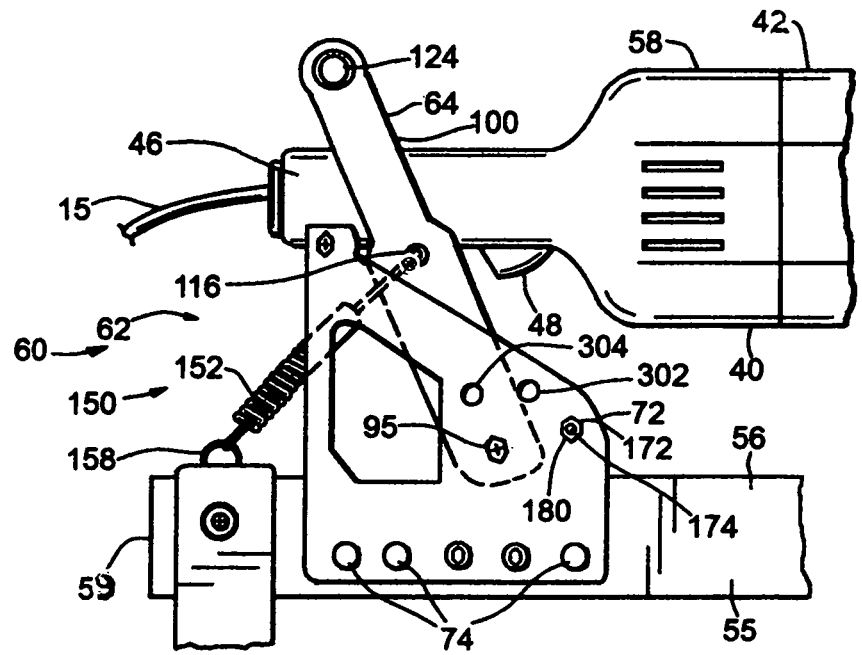
FIG. 4 is a side elevation view of a fragment of the rope-pulling equipment within which the FIG. 3 switching assembly is embodied and showing the actuator of the assembly in one, or a rearward, position.
Figure 5:
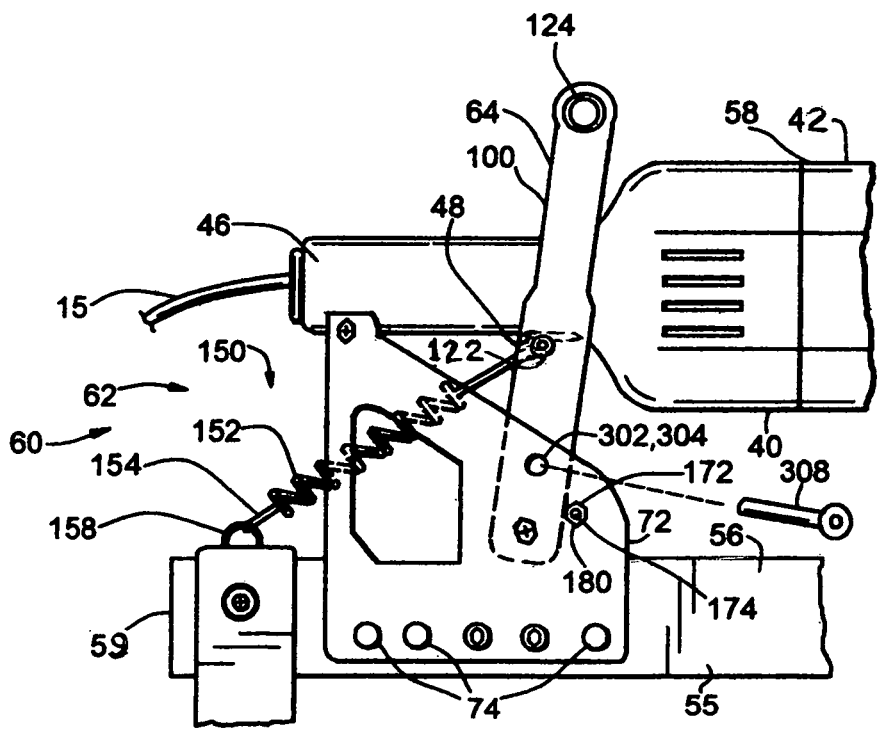
FIG. 5 is a side elevation view of the FIG. 4 fragment within which the FIG. 3 switching assembly is embodied and showing the actuator of the assembly in a second, or forward, position.

In connection with the foregoing and with reference still to FIGS. 3-6, the switching assembly 60 includes a base or frame structure, generally indicated 62, which is connected between the frame 56 of the equipment 58 and the hand tool 40 for supporting the hand grip portion 46 of the tool 40 in a desired, spaced condition above the frame 56. In addition, the switching assembly 60 includes an actuator 64 which is pivotally connected to the base 62 for pivotally movement relative thereto between a first, or rearward, position, as depicted in FIG. 4, at which the actuator 64 is out of engagement with the trigger-style ON/OFF switch 48 of the hand grip portion 46 of the tool 40 and a second, or forward, position, as depicted in FIG. 5, at which the actuator 64 engages and maintains the switch 48 in a depressed (and ON condition).

In addition, the base 62 includes a pair of parallel plates 70, 72 which are disposed on opposite sides of the rearward, or hand grip, portion 46 of the power tool 40. Each plate 70 or 72, in turn, includes a series of openings 74 along the lower edge thereof (as viewed in FIG. 3) with which the plates 70, 72 can be secured to the rail 55 along opposite sides thereof. In particular, the rail 55 includes a series of transversely-extending openings 76, and by positioning the plates 70, 72 along the sides of the rail 55 so that the openings 74 provided in the plates 70, 72 are aligned with the openings 76 provided in the rail 66, and then inserting the shanks of a pair of bolts 78 through the aligned openings 74, 76 (and then tightening nuts 80 and washers 81 about the shanks of the bolts 78 opposite the head ends thereof), the plates 70, 72 are fixedly secured to the rail 66.

Figure 9:
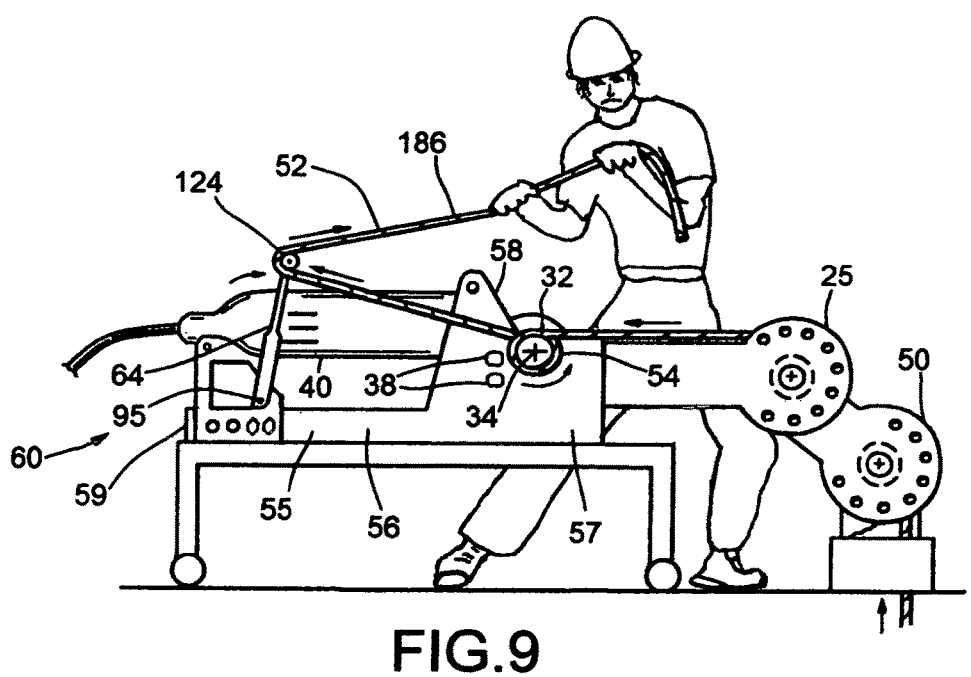
FIG. 9 is a side elevation view of the rope-pulling equipment of FIGS. 3-7 shown being utilized during a rope-pulling operation.

The plates 70, 72 also include an additional opening 82 adjacent the upper end thereof (as viewed in FIG. 3) which, when the plates 70, 72 are fixedly secured to the rail 66 as described above, is aligned with the opening 82 formed in the other plate 72 or 70. A bolt 84 having a shank 86 is directed endwise through the aligned openings 82, 82, and a nut 88 is tightened about the end of the shank 86 opposite the head end thereof to secure the bolt 84 through the plates 70, 72. When the power tool 40 is positioned in place within the equipment 58, the bolt 84 provides an upper surface upon which the underside of the hand grip portion 46 is adapted to rest as the power tool 40 remains secured in a fixed relationship with the base 56 by way of the bolts 38 (FIG. 9).

Furthermore, each plate 70 or 72 includes an opening 94 disposed medially of its upper and lower portions (as viewed in FIG. 3). When the plates 70, 72 are fixedly secured to the rail 55 as described above, the opening 94 provided in one of the plates 70 or 72 is aligned with the opening 94 provided in the other plate 72 or 70. As will be apparent herein, the aligned openings 94 are adapted to accept the shank 97 of a bolt 95 directed endwise therethrough for pivotally attaching the actuator 64 of the switching assembly 60 to the plates 70, 72.

With reference still to FIG. 3-6, the actuator 64 includes a pair of elongated members 100 which are positioned inboard of the plates 70, 72 and wherein each member 100 is disposed adjacent a corresponding one of the plates 70 or 72. Each member 100 has two opposite lower and upper ends 102, 104, respectively and is somewhat flat in shape. Defined within each member 100 is a first opening 106 which is disposed adjacent the lower end 102, a second opening 108 which is disposed approximately midway between the upper and lower ends 102, 104, and a third opening 110 which is disposed adjacent the upper end 104. For securing the members 100 to the plates 70, 72, the members 100 are positioned adjacent the plates 70, 72 so that the first openings 106 are aligned with the openings 94 of the plates 70, 72, and the bolt 95 is directed shank end-first through the sets of aligned openings 94, 106. A nut 112 (with washer 114) is secured upon the end of the bolt 95 opposite the head end thereof. With the bolt 95 secured through the sets of openings 94, 106, the members 100 of the actuator 64 are free to be pivoted about the shank 97 of the bolt 95 (and relative to the plates 70, 72) between a first, or rearward, condition as depicted in FIG. 4 and a second, or forward, condition, as depicted in FIG. 5.

The second openings 108 of the members 100 are also positioned in an aligned relationship with one another, and the shank of a bolt 116 is directed shank end-first through the aligned openings 108. A nut 118 and washer 120 are secured about the end of the bolt 116 opposite the head end thereof to secure the members 100 together. Preferably, a smooth-surfaced, tubular metal sleeve 122 having a hollow interior is positionable between the members 100 so that the shank of a bolt 116 is accepted by the hollow interior of the sleeve 122. As will be apparent herein, as the actuator 64 is moved (i.e. manually) from its first, or rearward, condition as shown in FIG. 4 relative to the plates 70, 72 to its second, or forward, condition as shown in FIG. 5, the outer surface of the sleeve 122 engages and slides along the underside of the trigger-style ON/OFF switch 48 of the power tool 40 so that the switch 48 is forcibly moved upwardly by the sleeve 122 from the FIG. 4 extended condition (at which the power tool 40 is switched OFF) to the FIG. 5 depressed condition (at which the power tool 40 is switched ON).

The third openings 110 of the members 100 are positioned in an aligned relationship with one another and accept a relatively lengthy rod 124 directed endwise therethrough. A metal tube 126 having a hollow interior extending therethrough is centrally positioned with respect to the upper ends 104 of the two members 100 and is affixed through the openings 110. Meanwhile, the hollow interior of the tube 126 accepts the shank of the rod 124 directed endwise therethrough. The tube 126 has a through-opening 128 defined therein and which is located substantially midway between its opposite ends, and the rod 124 has a series of through-openings 130 defined along the length thereof. By positioning the rod 124 through the tube 128 so that one of its openings 130 is aligned with the through-opening 128 of the tube 128, and then inserting the shank of a pin 132 endwise through the aligned openings 128, 130, the rod 124 is secured in place relative to the members 100. By subsequently removing the pin 132 from the aligned openings 128, 130 and then shifting the rod 124 longitudinally of the members 100 so that an alternative one of the through-openings 130 of the rod 124 is aligned with the through-opening 128 of the tube 126 and then re-inserting the pin 132 through the aligned openings 128, 130, the rod 124 can be fixed in an alternative position with respect to the members 100.

Figure 6:
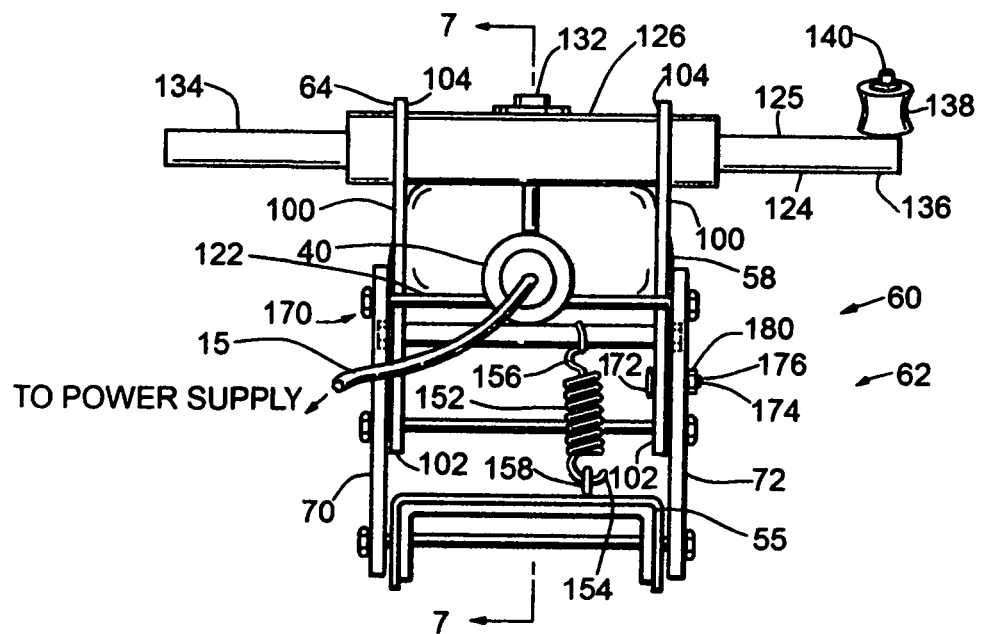
FIG. 6 is an end view of the FIG. 4 fragment as seen generally from the left in FIG. 4.

As will be apparent herein, the rod 124 defines a smooth outer tubular surface 125 over which a pulling rope 52 is draped, or routed, during the course of a rope-pulling operation conducted with the equipment 58. In this connection, the rod 124 possesses a sufficient length so that when secured through the members 100, each of the opposite ends, indicated 134, 136 of the rod 124, extends an appreciable distance from the nearest member 100. That is to say and as best shown in FIG. 6, when the rod 124 is pinned through the members 100, one rod end 134 is spaced an appreciable distance from its nearest member 100 and the other rod end 136 is spaced a considerable distance from the nearest member 100. If desired, there can be mounted adjacent the rod end 136 a small pulley 138 which can be rotatably secured to the rod 124 with a pin 140 and a nut 142. During a rope-pulling operation performed with the equipment 58 and during which the rope 52 is pulled upon by an operator, the pulley 138 acts as a stop which prevents the rope 136 from sliding off of the rod end 136. If it is desired to re-position the rod 124 so that the pulley 138 is disposed on the opposite side of the equipment 58 (as may be desired if the pulling rope is wrapped about the capstan 30, rather than the capstan 32), the pin 132 is simply removed from the aligned openings 128, 130, and the rod 124 is removed from the tube 126 and then re-inserted therein in a reversed condition so that the pulley 138 is positioned on the opposite side of the equipment 58 from the position shown in FIG. 6.

Figure 7:
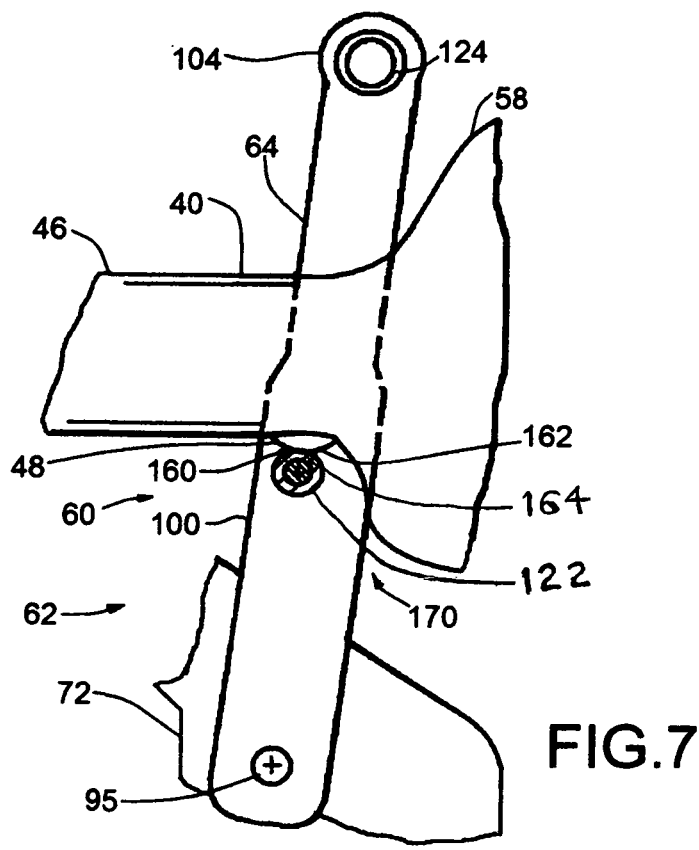
FIG. 7 is a longitudinal cross-sectional view of a portion of the fragment of FIG. 4 taken about along line 7-7 of FIG. 6.
Figure 8:
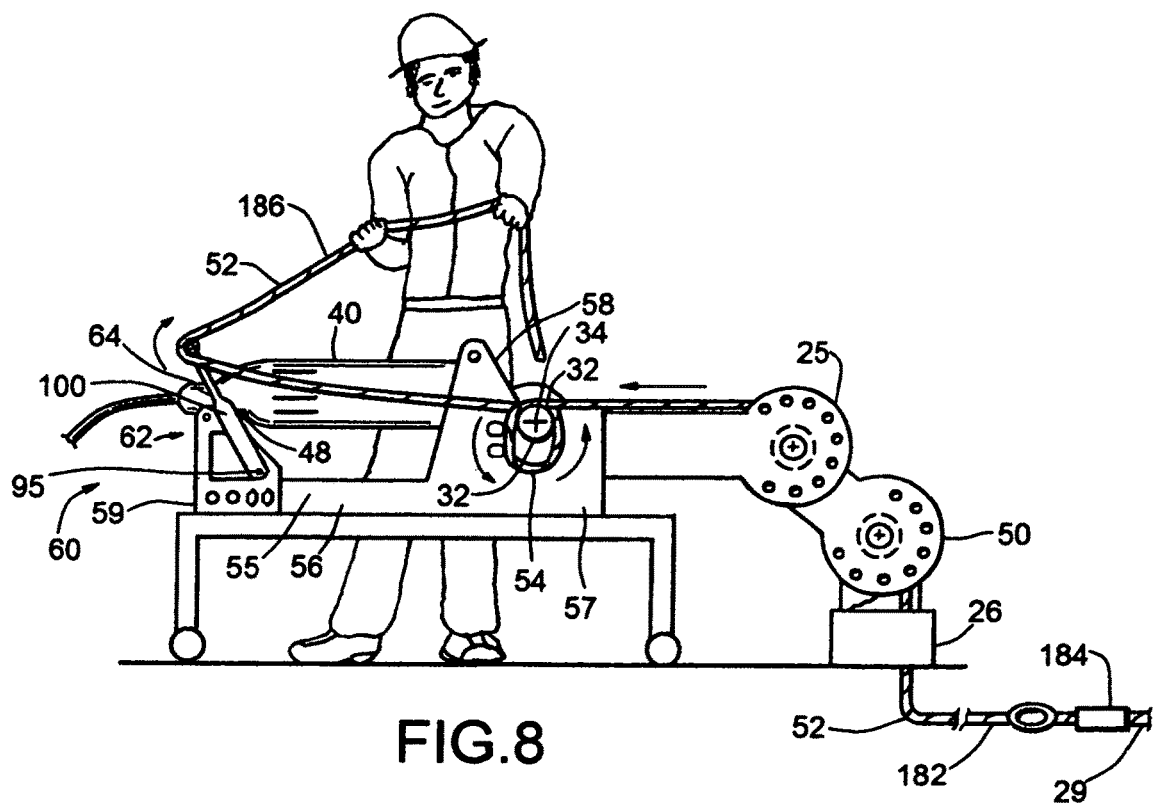
FIG. 8 is a side elevation view of the rope-pulling equipment of FIGS. 3-7 shown being readied for a rope-pulling operation.

As mentioned earlier, the pivotal movement of the actuator 64 from the FIG. 4 rearward condition to the FIG. 5 forward condition effects the movement of the ON/OFF switch 48 from its extended condition (i.e. the lowered condition as shown in FIG. 4) to its depressed condition (i.e. its raised condition as shown in FIG. 5) as the sleeve 122 of the actuator 64 is forced against the ON/OFF switch 48. In this connection and as best shown in FIG. 7, the switch 48 includes a rearward surface portion 160 and a forward surface portion 162 which are joined at a downwardly-directed tip 164. It is a feature of the switch assembly 60 that the engagement between the sleeve 122 of the actuator 64 and the switch 48 enables the spring-induced forces which are exerted (i.e. downwardly) upon the ON/OFF switch 48 to also bear against the outer surface of the sleeve 122 so that the actuator 64 is biased rearwardly for the duration of time that the sleeve 122 is in engagement with the ON/OFF switch 48. In other words and as long as the sleeve 122 of the actuator 64 engages the ON/OFF switch 48. The downwardly-directed biasing forces exerted upon the ON/OFF switch 48 which continually urge the ON/OFF switch 48 downwardly toward its extended condition are also urged against the sleeve 122 of the actuator 64 in a manner which urges the actuator 64 rearwardly from its forward, or FIG. 5, position.

In connection with the foregoing, it is also a feature of the switching assembly 60 that it includes means, generally indicated 170 in FIGS. 3 and 6, for limiting the movement of the actuator 64 forwardly of its FIG. 4 position to a forwardmost position, as best shown in FIG. 7, at which the rearward surface portion 160 of the ON/OFF switch 48 which engages the sleeve 122 urges the actuator 64 rearwardly. To this end, the limiting means 170 of the depicted switching assembly 60 includes a stop member 172 which is adapted to abut a surface of one of the members 100 of the assembly 60 when the actuator 64 reaches its (FIG. 7) forwardmost limit of travel so that the sleeve 122 is prevented from being moved further forwardly relative to the tool 40 to a position at which the sleeve 122 could be engaged by the forward surface portion 162 of the switch 48. This being the case—and as long as the sleeve 122 is in engagement with the ON/OFF switch 48, the spring-induced forces which are continually urged downwardly upon the ON/OFF switch 48 urge the sleeve 122 (and thus the actuator 64) rearwardly of its FIG. 7 forwardmost position by way of the rearward surface portion 160. Within the depicted switching assembly 60, the stop member 172 is in the form of a bolt 174 (FIG. 3) whose shank 176 has been inserted through an opening 178 provided in one of the plates 70 so that when the actuator 64 has been moved forwardly to its forwardmost, or FIG. 7 position, a forward edge of a member 100 abuts the head of the bolt 174 and thereby prevents further forward movement of the actuator 64. The bolt 174 (which is secured in place with a nut 180) thus provides an abutment surface for preventing forward movement of the actuator 64 beyond the FIG. 5 forwardmost position.

If desired, the switching assembly 60 can also include alternative, or supplemental, means, generally indicated 150 in FIGS. 4 and 5, for biasing the actuator 64 from the second, or forward, position as illustrated in FIG. 5 toward the first, or rearward, position as illustrated in FIG. 4. Within the assembly embodiment 60, such alternative or supplemental biasing means 150 is in the form of a tension spring 152 having two opposite hook-including ends 154, 156 (FIG. 3) wherein one end 154 of the spring 152 is secured to the rail 55 by way of an eyelet 158 anchored to the rail 55, and the other end 156 of the spring 152 is hooked to, or about, the sleeve 122 of the actuator 64. Forced movement of the actuator 64 from the FIG. 4 rearward position to the FIG. 5 forward position effects an extension of the length of the spring 152 from the original spring length illustrated in FIG. 4 so that the spring 152 exerts a continual and rearwardly-directed biasing force upon the actuator 64. It follows that upon release of the actuator 64 from a position disposed forwardly of the rearward, or FIG. 4, position permits the actuator 64 to return to its FIG. 4 rearward condition under the biasing influence of the spring 152.

Operation of the switching assembly 60 will now be described in conjunction with a rope-pulling operation performed with the equipment 58. More specifically and with reference to FIG. 8, there is depicted the equipment 58 when arranged in a desired position for pulling the rope 52 through and out of the conduit 26. The distal end, indicated 182, of the pulling rope 52 can be secured to a wire or cable 29 (by way of, for example, a crimp-on lanyard assembly 184) desired to be pulled through the conduit 26 by the rope 52. To ready the equipment 58 for a rope-pulling operation, the actuator 64 is positioned in its FIG. 4 rearward position (during which the power tool 40 is switched OFF), and then a section, indicated 54 in FIG. 8, of the rope 52 which leads from the conduit 26 is wound about a selected one of the capstans 30 or 32 (which, in the FIG. 7 view, is the capstan 32) and then the remaining, or proximal, end, indicated 186, of the rope 52 is routed beneath and then across the rod 124 of the actuator 64 to a position (as illustrated in FIG. 7) forwardly of the rod 124. Thereafter and to initiate a rope-pulling operation, the proximal end 186 of the rope 152 is then grasped by an operator (who is preferably standing alongside and forwardly of the rod 124, as depicted in FIG. 9) and then pulled forwardly of the equipment 58 so that the rope 52 pivots the actuator 64 from its FIG. 4 (and FIG. 8) rearward position to its FIG. 5 (and FIG. 9) forward position at which the power tool 40 is switched ON and the capstan 32 is rotated (by way of the energized power tool 40) about its rotation axis 34. While the actuator 64 is maintained in its forward condition (so that the power tool 40 remains energized), the operator can continue to pull the rope 52 forwardly of the actuator rod 124 so that sufficient tension is maintained upon the section 54 of the rope 52 wound about the capstan 32 so that the rope 52 is pulled, or advanced, through and out of the conduit 26 by the rotating capstan 32. If, during the rope-pulling operation, the pull upon the proximal end 186 of the rope 52 is relaxed, as needed, by the operator to relieve the tautness of the rope section 54 wound about the capstan 32, but the actuator rod 124 must still be maintained in its FIG. 4 forward condition by the rope 52 in order that the power tool 40 continue to rotate the capstan 32.

Therefore and as long as the rope 52 is sufficiently tensioned, or pulled upon, by the operator so that the actuator 64 remains in its forward, or depicted FIG. 5, position, the operator can (through the controlling of the amount of pulling force exerted upon the rope 52) control the tension, or tautness, of the section 54 of rope 52 wound about the capstan 32 so that the advancement of the rope 52 through and out of the conduit 26 can be had. It follows that the switching assembly 60 is advantageous in that it enables two operations (i.e. the switching of the power tool 40 ON and the controlling of the tension of the section 181 of rope 52 wound about the capstan 32) to be effected during a single operation, or action, of an operator. In other words, the switching assembly 60 enables an operator to initiate (and maintain) the rotation of the capstan 32 about its axis 34 and to control the advancement of the rope 52 being pulled through the conduit 26 as the operator pulls upon the rope 52 so that the actuator 64 is moved to its FIG. 5 forward position.

Another advantage provided by the switching assembly 60 relates to the aforementioned biasing of the actuator 64 rearwardly from its FIG. 5 forward position during a rope pulling operation. Such rearwardly-directed biasing forces can either be induced by the downwardly-directed spring-induced biasing forces exerted upon the sleeve 122 of the actuator 64 by way of the ON/OFF switch 48 or the rearwardly-directed forces exerted upon the actuator 64 by the spring 152. Therefore and if, for some reason, circumstances require that the rope pulling operation be suddenly ceased, the operator need only release his grasp upon the proximal end 186 of the rope 52 so that the actuator 64 is thereafter permitted to pivot rearwardly from its FIG. 5 forward position so that the sleeve 122 of the actuator 64 moves out of engagement with the ON/OFF switch 48. Upon disengagement of the ON/OFF switch 48 by the sleeve 122, the ON/OFF switch 48 of the power tool 40 is released from its depressed condition so that the switch 48 returns to its extended position and the power tool 40 is switched OFF. Therefore and for safety purposes, the switching assembly 60 provides a dead man's switch which effects the cessation of the rope advancement through the conduit 26 upon release of the rope 52 by the operator.

Figure 10:
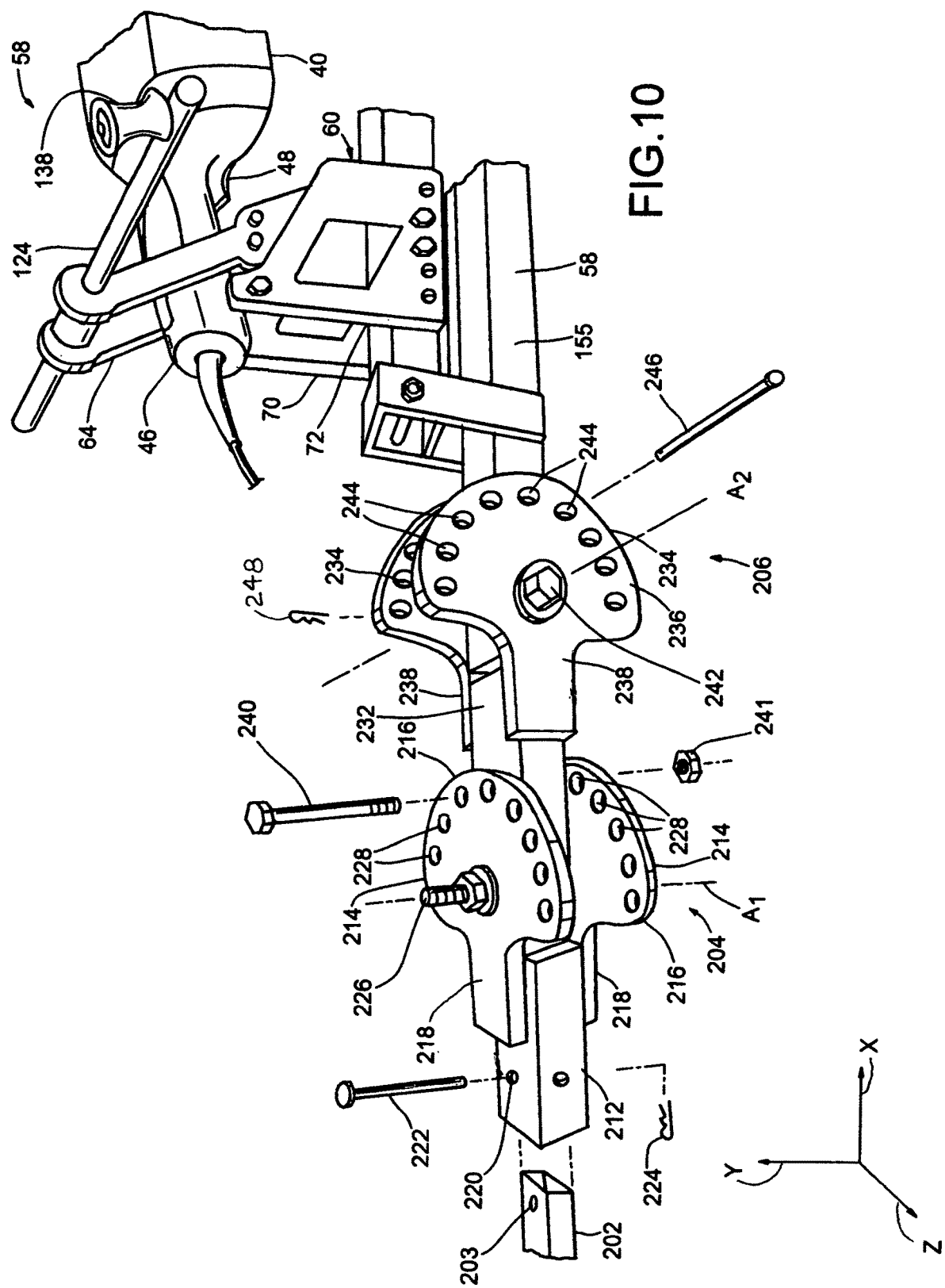
FIG. 10 is a perspective view of exemplary structure with which rope-pulling equipment can be supported in a cantilever fashion from the hitch of a truck or other vehicle.

With reference to FIG. 10, there is depicted an illustrative support structure, generally indicated 200, with which the rope-pulling equipment 58 can be supported in a cantilever fashion from a hitch member 202 having a vertically-opening through-opening 203 defined therein and which is affixed to the frame of a pickup truck or similar vehicle (not shown). The support structure 200 includes a pair of knuckle assemblies, generally indicated 204 and 206, which are joined in a series relationship with one another and to a base rail 155 upon which the equipment 58 is fixedly supported to accommodate a positioning of the equipment 58 in any of a number of alternative angular orientations with respect to the hitch member 202.

In connection with the foregoing, one knuckle assembly 204 includes a strut section 212 having a hollow interior which is shaped to receive the hitch member 202 when directed endwise thereover and further includes a pair of plates 214 disposed on (and attached to) the (upper and lower) sides of the strut section 212, and each plate 214 includes a semi-circular-shaped portion 216 and a boss section 218 extending from a side of the portion 216 opposite its semi-circular-shaped edge. The plates 214 are fixedly joined to (e.g. welded to) the strut section 212 to join the plates 214 to the strut section 212. For connecting the knuckle assembly 204 to the hitch member 202, the strut section 212 includes a vertically-opening through-opening 220 which, when positioned about the hitch member 202 and aligned with the hitch member through-opening 203, accepts the shank of a pin 222 which, in turn, can be secured through the aligned openings 203, 220 with a Cotter key 224. In addition, the semi-circular-shaped plates 214 are provided with aligned centrally-disposed openings through which a bolt 226 is securable and a series of through-openings 228 disposed along and adjacent the perimeter of the semi-circular-shaped portions 212.

By comparison, the other knuckle assembly 206 includes a strut section 232 having a first vertically-opening opening which is aligned with the bolt 226-accepting openings of the knuckle assembly 204 and accepts the bolt 226 for joining the knuckle assembly 206 to the knuckle assembly 204. In addition, the strut section 232 defines a second vertically-opening opening which can be selectively aligned with any of the series of openings 228 disposed along the perimeter of the semi-circular-shaped portions 216 as the knuckle assembly 206 is pivoted relative to the knuckle assembly 204 about the shank of the bolt 226. The knuckle assembly 206 further includes a pair of plates 234 disposed on (and attached to) the (right and left) sides of the strut section 232, and each plate 234 includes a semi-circular-shaped portion 236 and a boss section 238 extending from a side of the portion 236 opposite its semi-circular-shaped edge and which is fixedly joined to (e.g. welded to) a corresponding side of the strut section 232.

In addition, the semi-circular-shaped portions 236 of the plates 234 define centrally-disposed openings through which a bolt 242 is securable and a series of through-openings 244 disposed along and adjacent the perimeter of each semi-circular-shaped portion 236.

It follows that by pivoting the knuckle assembly 206 relative to the knuckle assembly 204 about the bolt 226 permits the longitudinal axis of the strut section 232 to be directed in any of a number of horizontally-disposed directions. Stated another way and with reference to the indicated X, Y and Z-coordinate axes, the pivotal connection between the knuckle assemblies 204 and 206 permits the longitudinal axis of the strut section 232 to be moved through the X-Z plane as it pivots about an axis $A_1$ which is parallel to the indicated Y-axis. By pivoting the knuckle assembly 206 relative to the knuckle assembly 204 and positioning the second of the vertically-disposed openings of the strut section 232 in an aligned relationship with a selected one of the through-openings 228 and directing the shank of a pin 240 through the aligned openings 228 of the plates 214 and strut section 232, the longitudinal axis of the strut section 232 can be secured in its desired angular orientation relative to the knuckle assembly 204 and about the axis $A_1$. A nut 241 can be threaded upon end of the bolt 240 opposite the head thereof to secure the bolt 240 through the plates 214 and strut section 232.

For securement of the equipment 58 to the knuckle assembly 206, the base rail 155 upon which the equipment 58 is supported includes a transversely-opening through-opening which, when positioned between the plates 234 and aligned with the centrally-disposed openings defined therein, accepts the shank of the bolt 242 which, in turn, can be secured through the aligned openings with a nut. Meanwhile, the rail 155 includes a second transversely-extending opening which is positionable in an aligned relationship with any of the series of through-openings 244 disposed along and adjacent the perimeter of the semi-circular-shaped portions 236 as the rail 155 is pivoted relative to the knuckle assembly 286 and about the bolt 242.

It follows that by pivoting the rail 155 upon which the equipment 58 is supported relative to the knuckle assembly 206 and about the bolt 242 permits the longitudinal axis of the equipment 58 to be directed in any of a number of angular orientations with respect to the knuckle assembly 206. Stated another way and with reference to the indicated X, Y and Z-coordinate axes (and at which the plates 214 of the depicted knuckle assembly 204 are arranged parallel to the X-Z plane, the pivotal connection between the rail 155 and the knuckle assemblies 206 permits the longitudinal axis of the rail 155 to be moved through the X-Y plane as it is pivoted about an axis $A_2$ which is parallel to the indicated Z-axis. By pivoting the rail 155 relative to the knuckle assembly 206 and positioning the second of the transversely-disposed opening of the rail 155 in an aligned relationship with a selected one of the through-openings 244 and then directing the shank of a pin 246 through the aligned openings 244 of the plates 234 and rail 155, the longitudinal axis of the rail 155 (and thus the equipment 58) can be secured in its desired orientation relative to the knuckle assembly 206 and about the axis $A_2$. The pin 246 can, in turn, be secured through the aligned openings 244 of the plates 234 and rail 255 with a key 248.

It follows from the foregoing that since the knuckle assembly 206 can be pivoted relative to the knuckle assembly 204 about one pivot axis $A_1$ and the rail 55 can be pivoted relative to the knuckle assembly 206 about the pivot axis $A_2$, the longitudinal axis of the rail 155 (and thus the equipment 58) can be oriented in any of a number of angular orientations with respect to the hitch member 202.

It will be understood that numerous modifications and substitutions can be had to the aforedescribed embodiment 60 without departing from the spirit of the invention. For example and with reference to FIGS. 3 and 5, the switching assembly 60 can include a trigger-locking arrangement, generally indicated 300, which enables an operator to releasably lock the actuator 64 in its forwardmost position as depicted in FIGS. 5 and 9. Such a locking arrangement 300 can, and as depicted in FIGS. 3 and 5, include a locking pin 308 and involve the formation of an opening 302 within one of the plates 70 and another opening 304 within an adjacent member 100 so that when the actuator 64 is disposed in its (FIG. 5) forwardmost position, the openings 302 and 304 are aligned. At that point, the pin 308 can be inserted shank end-first through the aligned openings 302, 304 to lock the actuator 64 in its FIG. 5 forwardmost position. To release the actuator 64 from such a locked condition, the pin 308 is simply removed from the aligned openings 302 and 304. The provision of such a locking arrangement 300 within the switching assembly 60 enhances the versatility of the switching assembly 60 in that it enables an operator to lock the ON/OFF switch 48 in its depressed (or ON) position while he uses an alternative means, such as a foot switch (not shown), to control the ON/OFF switching of the power tool 40.

Accordingly, the aforedescribed embodiment 60 are intended for the purpose of illustration and not as limitation.

The invention claimed is:

1. A switching assembly for rope-pulling equipment having a forward end and a rearward end and a base upon which a capstan is mounted for rotation about an axis and which is adapted to support an electrically-powered power tool for rotating the capstan about its rotation axis, wherein the power tool includes an ON/OFF switch which is movable between an extended condition at which the power tool is switched OFF and a depressed condition at which the power tool is switched ON and wherein the ON/OFF switch of the power tool is biased from the depressed condition toward the extended condition and wherein rope is pulled with the equipment by wrapping the rope about the capstan, switching the power tool ON and pulling upon the rope to tension the rope wound about the capstan and thereby advance the rope along the equipment from the forward end toward the rearward end thereof as the capstan is rotated, the switching assembly comprising:

an actuator having a switch-engaging portion and which is mounted upon the equipment for pivotal movement relative to the base about an axis of pivot between a rearward condition at which the switch-engaging portion of the actuator is out of engagement with the ON/OFF switch of the power tool and a forward condition at which the switch-engaging portion of the actuator is in engagement with the ON/OFF switch of the power tool and maintains the ON/OFF switch in the depressed condition, and the actuator having a rope-engaging section which is disposed in such a relationship with the capstan so that by wrapping the rope to be pulled about the capstan and then routing an end of the rope around the rope-engaging section of the actuator, the end of the rope can thereafter be pulled forwardly of the equipment to pivot the actuator about the axis of pivot to the forward condition at which the ON/OFF switch of the power tool is moved to its depressed condition and to the tension the rope which is wound about the capstan so that rotation of the capstan advances the rope along the equipment as aforesaid.

2. The assembly as defined in claim 1 wherein the power tool equipment includes a spring for biasing the ON/OFF switch from the depressed condition toward the extended condition, and the actuator is adapted to cooperate with the ON/OFF switch of the power tool so that as long as the ON/OFF switch is engaged by the switch-engaging portion of the actuator, the actuator is biased from the forward condition toward the rearward condition by the biasing force of the spring of the power tool equipment.

3. The assembly as defined in 2 wherein there is associated with the rope-pulling equipment an abutment surface which limits the forward movement of the actuator from the rearward condition to a forward limit of travel so that when the actuator has been moved forwardly from the rearward condition to the forward limit of travel, the ON/OFF switch is moved from the extended condition to the depressed condition by the switch-engaging portion of the actuator and said biasing force of the spring of the power tool equipment urges the actuator from the forward condition toward the rearward condition.

4. The assembly as defined in claim 1 wherein the switch-engaging portion of the actuator is disposed between the axis of pivot and the rope-engaging section of the actuator.

5. The assembly as defined in claim 1 wherein each of the switch-engaging portion of the actuator and the rope-engaging section of the actuator is elongated in shape and has a longitudinal axis which is arranged substantially parallel to the axis of pivot.

6. The assembly as defined in claim 5 wherein the base of the equipment has a longitudinal axis which extends forwardly and rearwardly of the equipment, and each of the switch-engaging portion and the rope-engaging sections include elongated members which are disposed substantially normal to the longitudinal axis of the equipment.

7. The assembly as defined in claim 6 wherein the each of the elongated members of the switch-engaging portion and the rope-engaging portion are tubular in form having outer surfaces for engaging, respectively, the ON/OFF switch of the power tool and the rope routed across the rope-engaging section.

8. The assembly as defined in claim 1 wherein the base of the equipment includes two opposite sides, and the actuator includes a pair of plate members which are arranged in a substantially parallel relationship with one another and are disposed on opposite sides of the base for pivotal movement relative thereto as the actuator is pivoted between the rearward and forward conditions, and the switch-engaging portion of the actuator is arranged between the two plate members.

9. The assembly as defined in claim 1 further comprising a spring for acting between the base of the equipment and the actuator for continually biasing the actuator from the forward condition toward the rearward condition.

10. The assembly as defined in claim 9 further including means for releasably securing the actuator in its forward position.

11. A switching assembly for rope-pulling equipment having a forward end and an opposite rearward end and having a base upon which a capstan is mounted for rotation about an axis of rotation and means for holding an electrically-powered power tool upon the base wherein the power tool, when switched ON, is adapted to rotate the capstan about the axis of rotation and includes an ON/OFF switch which is movable relative to the base between an extended condition at which the power tool is switched OFF and a depressed condition at which the power tool is switched ON and wherein the ON/OFF switch is biased from the depressed condition toward the extended condition and wherein a rope is pulled with the equipment by wrapping the rope about the capstan, switching the power tool ON and pulling upon the rope to tension the rope wound about the capstan to thereby advance the rope along the equipment from the forward end toward the rearward end thereof, the switching assembly comprising:

an actuator having a switch-engaging portion and which is mounted upon the base for pivotal movement relative thereto between a rearward condition at which the switch-engaging portion is out of engagement with the ON/OFF switch so that the power tool is switched OFF and a forward condition at which the switch-engaging portion moves the ON/OFF switch to the depressed condition so that the power tool is switched ON, and the actuator having a rope-engaging section which is disposed in such a relationship with the capstan so that by wrapping the rope to be pulled about the capstan and then routing an end of the rope about the rope-engaging section of the actuator and then manually pulling forwardly upon the end of the rope, the actuator is pivoted forwardly about the axis of pivot from the rearward condition to the forward condition and to thereby switch the power tool ON and to tension the rope wrapped about the capstan so that the rope is advanced along the equipment as aforesaid.

12. The assembly as defined in claim 11 wherein the power tool equipment includes a spring which exerts a biasing force upon the ON/OFF switch for biasing the ON/OFF switch from the depressed condition toward the extended condition, and the actuator is adapted to cooperate with the ON/OFF switch of the power tool so that as long as the ON/OFF switch is engaged by the switch-engaging portion of the actuator, the actuator is biased from the forward condition toward the rearward condition by the biasing force for biasing the ON/OFF switch which urges the ON/OFF switch from the depressed condition toward the extended condition.

13. The assembly as defined in claim 12 wherein the switch-engaging portion of the actuator is disposed between the axis of pivot and the rope-engaging section of the actuator.

14. The assembly as defined in 11 wherein there is associated with the rope-pulling equipment an abutment surface which limits the forward movement of the actuator from the rearward condition to a forward limit of travel so that when the actuator has been moved forwardly from the rearward condition to the forward limit of travel, the ON/OFF switch is moved from the extended condition to the depressed condition by the switch-engaging portion of the actuator and said biasing force exerted upon the ON/OFF switch for urging the actuator from the forward condition toward the rearward condition.

15. The assembly as defined in claim 11 wherein each of the switch-engaging portion of the actuator and the rope-engaging section of the actuator is elongated in shape and has a longitudinal axis which is arranged substantially parallel to the axis of pivot, and wherein the base of the equipment has a longitudinal axis which extends forwardly and rearwardly of the equipment, and each of the switch-engaging portion and the rope-engaging sections include elongated members which are disposed substantially normal to the longitudinal axis of the equipment.

16. The assembly as defined in claim 15 wherein the each of the elongated members of the switch-engaging portion and the rope-engaging portion are tubular in form having outer surfaces for engaging, respectively, the ON/OFF switch of the power tool and the rope routed across the rope-engaging section.

17. The assembly as defined in claim 11 further comprising a spring for acting between the base of the equipment and the actuator for continually biasing the actuator from the forward condition toward the rearward condition.

18. The assembly as defined in claim 11 further including means for releasably securing the actuator in its forward position.

19. A switching assembly for rope-pulling equipment having a forward end and an opposite rearward end and having a base upon which a capstan is mounted for rotation about an axis of rotation and means for holding an electrically-powered power tool upon the base wherein the power tool is elongated in shape having a working end disposed adjacent the forward end of the equipment for rotating the capstan about the axis of rotation and a hand grip portion disposed adjacent the end thereof opposite the working end thereof and wherein there is associated with the hand grip portion an ON/OFF switch which is movable relative to the hand grip portion between an extended condition at which the power tool is switched OFF and a depressed condition at which the power tool is switched ON and wherein the ON/OFF switch is biased from the depressed condition toward the extended condition and wherein a rope is advanced along the equipment from the forward end toward the rearward end thereof by wrapping the rope about the capstan, depressing the ON/OFF switch to switch the power tool ON and pulling upon the rope so that the rope wound about the capstan is tensioned thereabout, the switching assembly comprising:

an actuator having a switch-engaging portion and which is mounted upon the equipment for pivotal movement relative thereto about an axis of pivot between a first condition at which the switch-engaging portion of the actuator is out of engagement with the ON/OFF switch of the power tool so that the power tool is switched OFF and a second condition at which the ON/OFF switch is moved to the depressed condition so that the power tool is switched ON, and means for limiting the forward movement of the actuator to a forwardmost limit of travel at which the biasing forces which bias the ON/OFF switch toward the extended condition also bias the actuator rearwardly from the forwardmost position, the actuator having a rope-engaging section about which the rope can be routed so that by wrapping the rope to be pulled about the capstan and then routing an end of the rope about the rope-engaging section of the actuator and then pulling forwardly upon the end of the rope routed about the rope-engaging section so that the actuator is pivoted forwardly about the axis of pivot by the pulled end of the rope from the first condition to the second condition to switch the power tool ON and to tension the section of the rope wrapped about the capstan so that rotation of the capstan about the axis of rotation advances the rope along the equipment as aforesaid.

20. The assembly as defined in claim 19 wherein the switch-engaging portion of the actuator is disposed between the axis of pivot and the rope-engaging section of the actuator.

\* \* \* \* \*